United States Patent Office 3,652,703
Patented Mar. 28, 1972

3,652,703
CONVERSION OF OLEFINS
Robert B. Regier, Bartlesville, Okla., assignor to
Phillips Petroleum Company
No Drawing. Filed Nov. 3, 1969, Ser. No. 873,505
Int. Cl. C07c 3/62, 11/02, 13/00
U.S. Cl. 260—683 D
11 Claims

ABSTRACT OF THE DISCLOSURE

An olefin is converted to one or more different olefins by contact with a catalyst comprising silica and ruthenium or a compound of ruthenium.

---

This invention relates to the conversion of olefins. In one aspect it relates to a process for converting an olefin according to the olefin reaction by contact with a catalyst comprising silica and ruthenium or a ruthenium compound.

A wide variety of heterogeneous and homogeneous catalyst systems have been found to be active for the olefin reaction. It is advantageous to find processes for the olefin reaction utilizing catalysts not previously known for this reaction.

An object of this invention is to convert olefins to products comprising olefins different from the starting material. Another object of the invention is to convert olefins by the olefin reaction utilizing catalysts not previously known for this process.

Other aspects, objects and the advantages of my invention are apparent in the written description and the claims.

According to the invention olefins are converted according to the olefin reaction by contact with a catalyst comprising silica and ruthenium or a compound of ruthenium.

The term "olefin reaction," as used herein, is defined as a process for the catalytic conversion over a catalyst of a feed comprising one or more ethylenically unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in the resulting product consisting of hydrogen, saturated hydrocarbons, and compounds which can be visualized as formed by skeletal isomerization but which cannot be visualized as formed by one or more of the above-noted reactions, comprises less than 25 percent by weight of the total of said resulting product. Feed components and the unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction has been designated by other names including for example, "olefin dismutation," "olefin metathesis," and "disproportionation." In the present application the terms olefin reaction, olefin dismutation, and olefin metathesis are used interchangeably to designate the reaction as defined hereinabove. The term disproportionation is used to define one aspect of the olefin reaction.

The olefin reaction can be illustrated by the following reactions within the definition of the reaction:

(1) The disproportionation of an acyclic mono- or polyene having at least 3 carbon atoms into other acyclic mono- or polyenes of both higher and lower number of carbon atoms; for example, the disproportionation of propylene to produce ethylene and butenes; the disproportionation of 1,5-hexadiene to produce ethylene and 1,5,9-decatriene;

(2) The conversion of an acyclic mono- or polyene having 3 or more carbon atoms and a different acyclic mono- or polyene having 3 or more carbon atoms to produce different acyclic olefins; for example, the conversion of propylene and isobutylene to produce ethylene and isopentene;

(3) The conversion of ethylene and an internal acyclic mono- or polyene having 4 or more carbon atoms to produce other olefins having a lower number of carbon atoms than that of the acyclic mono- or polyenes; for example, the conversion of ethylene and 4-methylpentene-2 to produce 3-methylbutene-1 and propylene;

(4) The conversion of ethylene or an acyclic mono- or polyene having 3 or more carbon atoms and a cyclic mono- or cyclic polyene to produce an acyclic polyene having a higher number of carbon atoms than that of any of the starting materials; for example, the conversion of cyclooctene and 2-pentene to produce 2,10-tridecadiene; the conversion of 1,5-cyclooctadiene and ethylene to produce 1,5,9-decatriene;

(5) The conversion of one or more cyclic mono- or cyclic polyenes to produce a cyclic polyene having a higher number of carbon atoms than any of the starting materials; for example, the conversion of cyclopentene to produce 1,6-cyclodecadiene; (continued reaction can give higher molecular weight materials);

(6) The conversion of an acyclic polyene having at least 7 carbon atoms and having at least 5 carbon atoms between any two double bonds to produce acyclic and cyclic mono- and polyenes having a lower number of carbon atoms than that of the feed; for example, the conversion of 1,7-octadiene to produce cyclohexene and ethylene;

(7) The conversion of one or more acyclic polyenes having at least 3 carbon atoms between any two double bonds to produce acyclic and cyclic mono- and polyenes generally having both a higher and lower number of carbon atoms than that of the feed material; for example, the conversion of 1,4-pentadiene to produce 1,4-cyclohexadiene and ethylene.

Any olefin which is convertible according to the olefin reaction can be used in the process of the invention. Included among those which can be used are acyclic mono- and polyenes having at least 3 carbon atoms per molecule including cycloalkyl, cycloalkenyl, and aryl derivatives thereof; cyclic mono- and polyenes having at least 4 carbon atoms per molecule including alkyl and aryl derivatives thereof; mixtures of at least two of the above olefins; and mixtures of ethylene and at least one of the above olefins. Many useful reactions are accomplished with acyclic olefins having 3-30 carbon atoms per molecule and with cyclic olefins having 4-30 carbon atoms per molecule, mixtures thereof and mixtures with ethylene.

It has been found that within the scope of this invention certain olefins react at a faster rate than other olefins. Also, in employing certain olefins higher conversions are obtained than with other olefins under comparable reaction conditions. For example, the contact of a symmetrical monoolefin with a catalyst of the invention to give different olefin products (i.e., the reactions exemplified under number (1) above) apparently requires some double bond migration to take place before the disproportionation reaction proceeds at a significant rate. For similar reasons, the conversion of a mixture of ethylene and a 1-olefin proceeds at a slower rate and lower conversion than the conversion of a mixture of ethylene and an internal olefin. It has also been found that branching or the presence of inert polar substituents sometimes decrease the reactivity of a double bond in the feed olefin as the branching or polar substituent approaches the double bond. Accordingly, the present invention is directed primarily to the conversion of those olefins or combination of olefins which are capable of undergoing the olefin reaction to a significant degree when contacted with the catalyst of the present invention under reaction conditions suitable for effecting the olefin reaction.

Among the olefins which are capable of undergoing the olefin reaction to a significant degree are those contained in the following classes:

(1) Acyclic monoolefins, including those with aryl, cycloalkyl, and cycloalkenyl substituents, having 3–20 carbon atoms per molecule with no branching closer than about the 3-position to the double bond, no quaternary carbon atoms and no aromatic substitution closer than the 4-position to the double bond, and mixtures of such unsubstituted acyclic monoolefins. Some examples of these are propylene, pentene-1, pentene-2, butene-1, butene-2, 3-methylbutene-1, hexene-2, octene-4, nonene-2, 4-methylpentene-1, decene-3, 8-ethyldecene-2, dodecene-4, vinylcyclohexane, 4-vinylcyclohexene, eicosene-1, and the like.

(2) A mixture of ethylene and one or more acyclic unsubstituted internal monoolefins of (1). Some examples of such mixtures are ethylene and butene-2, ethylene and pentene-2, ethylene and hexene-3, ethylene and heptene-3, ethylene and 4-methylpentene-2, ethylene and octene-4, ethylene and dodecene-4, and the like.

(3) Acyclic, nonconjugated polyenes having from 5 to about 20 carbon atoms per molecule, containing from 2 to about 4 double bonds per molecule and having no double bond with branching nearer than the 3-position to that double bond, and having at least one double bond with no quaternary carbon atoms and no aromatic substitution nearer than the 4-position to that double bond, or mixtures of such polyenes. Some examples are 1,4-pentadiene, 1,5-hexadiene, 1,7-octadiene, 2,6-decadiene, 1,5,9-dodecatriene, 4-methylheptadiene-1,6, 1,7-octadiene, 1,6-octadiene, and the like.

(4) A mixture of ethylene and one or more acyclic polyenes of (3) which contain at least one internal double bond. Some examples are ethylene and 1,6-octadiene, ethylene and 1,5-decadiene, and the like.

(5) Cyclopentene.

(6) Cyclic and bicyclic monoolefins having 7 to 12 ring carbon atoms, including those substituted with up to 3 alkyl groups having up to about 5 carbon atoms, with no branching closer than the 3-position and with no quaternary carbon atoms closer than the 4-position to the double bond, and mixtures of such olefins including mixtures with cyclopentene. some examples are cycloheptene, cyclooctene, 4-methylcyclooctene, 3-methyl-5-ethylcyclodecene, cyclononene, cyclododecene, norbornene, and the like.

(7) A mixture of one or more of the monocyclic olefins of (6) with either ethylene or with one or more unsubstituted acyclic monoolefins of (1). Some examples of these are ethylene and cycloheptene, ethylene and cyclooctene, propylene and cyclodecene, pentene-2 and cyclooctene, ethylene and cyclododecene, and the like.

(8) Cyclic and bicyclic nonconjugated polyenes having from 5 to about 12 ring carbon atoms, including those substituted with up to 3 alkyl groups having up to about 5 carbon atoms each, having at least one double bond with no branching closer than the 3-position and with no quaternary carbon atoms closer than the 4-position to that double bond, and mixtures thereof. Some examples of these are 1,5-cyclooctadiene, 1,5,9-cyclododecatriene, 1,4-cycloheptadiene, norbornadiene, and the like.

(9) A mixture of one or more monocyclic polyenes of (8) with one or more acyclic 1-olefins having from 2 to about 10 carbon atoms, having no branching nearer than the 3-position and no quaternary carbon atoms nearer than the 4-position to the double bond. Some examples of these are 1,5-cyclooctadiene and ethylene, 1,5,9-cyclodecatriene and ethylene, 1,5,9-cyclododecatriene and pentene-1, and the like.

(10) Polar group-substituted olefinic compounds of classes (1) through (9) containing from about 5 to about 20 carbon atoms per molecule in which the polar group, such as a halogen atom, is sufficiently removed from the active double bond (generally no nearer to the double bond than the 5-position) so as not to interfere with the reaction, and mixtures with unsubstituted members of class (1). Some examples are 5-chloropentene-1, a mixture of pentene-2 and 5-chloropentene-1, and the like.

Preferred feeds for the present process are those olefinic compounds having 10 carbon atoms or less per molecule. Still more preferred are those having 6 carbon atoms or less per molecule.

The catalyst support is predominantly silica. Any suitable catalyst grade silica can be employed. Some examples are precipitated silica gel, microspheroidal silica, flame hydrolyzed silica and silica aerogels. These materials have appreciable surface area, usually in the range of 50 to 700 m.$^2$/g., and can range from fine powders to coarse granules. These materials often contain small amounts of other compounds including for example amounts of alumina and sodium in the order of a few tenths of a percent by weight and smaller. Amounts of these and other materials which do not substantially prevent the olefin reaction are acceptable.

Catalysts of the invention can be prepared by incorporating into a silica containing base ruthenium or a suitable ruthenium compound by any suitable method such as, for example, impregnation, coprecipitation or dry mixing. Excellent catalysts are prepared by impregnating suitable silica support material with ruthenium oxide or a compound convertible to ruthenium oxide on calcination. The finished catalyst can be in the form of powders, granules, agglomerates, pellets, spheres, extrudates, or other suitable configuration, depending upon the type of contacting technique employed in the reaction.

Sufficient promoter is used to obtain the desired activity. Because the ruthenium or ruthenium compound usually is more expensive than the base material, unnecessarily large amounts ordinarily are not used. Generally the finished catalyst contains from about 0.1 to about 20, preferably from 2 to about 5 weight percent ruthenium or ruthenium compound, calculated as the metal. However, larger amounts can be used.

The metal or metal compound used in the preparation of the catalyst does not necessarily determine the catalytically active form of the finished catalyst. Even though a particular compound is used in the preparation of the catalyst, for example ruthenium oxide, and is closely associated with and possibly stabilized by the silica containing base, some or all of the compound may be reduced to the metallic form in the presence of the highly reducing conditions of the conversion. Preferably however, the ruthenium, at the initial time of contact in the conversion reaction, is in the form of an oxide. Activation and regenera- can be accomplished by contact with an oxidizing gas, for example air, at high temperatures, including temperatures in the range of 600–1500° F. for a sufficient period of time to obtain the desired activation. Times in the range of 0.1 to 24 hours are suitable.

The process is carried out by any suitable contacting technique, either batchwise or continuously, using a fixed catalyst bed, stirrer equipped reactor or other mobile catalyst contacting process. The conditions of the process including conditions of temperature, pressure and contact time, are selected to obtain a combination of conditions suitable for obtaining the olefin reaction. Temperatures in the range of about 750 to about 1200° F., pressures in the range from about 0 to about 2000 p.s.i.g. and rates in the range of about 0.1 to about 25 weight hourly space velocity, grams feed per gram of catalyst, are suitable.

The following examples illustrate the process of the invention.

EXAMPLE I

A ruthenium-containing catalyst was prepared by dissolving 0.070 g. of Ru(OH)Cl$_3$ in 10 ml. absolute ethanol and pouring in 2.00 g. of a —20 +40 mesh commercial microspheroidal intermediate density catalytic silica. The slurry was evaporated to dryness on a hot plate. Sufficient ruthenium was present to provide about 1.6 weight percent ruthenium (calculated as a metal) based on the total composition. The dried catalyst was charged into a fixed bed reactor and activated by heating in flowing dry air to a temperature of about 392° F., then changing to a flow of wet air (to hydrolyze the ruthenium compound to prevent its loss as the more volatile chloride) and slowly raising the temperature to about 572° F., maintaining a temperature of about 572° F. for one hour, then changing back to a flow of dry air and heating to 932° F.

Butene-1 feed was disproportionated by contact with the above catalyst in a quartz fixed bed reactor. The tests were made at atmospheric pressure and at a space rate of about 5 WHSV. The disproportionation activity of the catalyst system was tested at several temperature levels and the results of these tests are shown in the table below, in weight percent.

| Temperature, ° F | 946 | 998 | 1,054 | 1,099 |
|---|---|---|---|---|
| Effluent analysis, wt. percent: | | | | |
| Ethylene | 0.15 | 0.37 | 0.91 | 2.00 |
| Propylene | 0.11 | 0.35 | 1.19 | 3.28 |
| Butene-1 | ~96.0 | ~90.6 | ~81.9 | ~71.2 |
| Cis- and trans-butene-2 | 3.64 | 8.27 | 15.0 | 21.0 |
| Butadiene | | | | 0.06 |
| n-Pentenes | Tr | 0.12 | 0.41 | 1.21 |
| Pentadienes | | | | 0.89 |
| Hexene-3 | 0.07 | 0.18 | 0.29 | 0.37 |

The data in the table above show that the catalyst system of the present invention shows activity for the disproportionation of butene-1 into other olefins of both higher and lower molecular weight including ethylene and hexene-3.

EXAMPLE II

Using the same catalyst system described above and with essentially the same conditions described above, the disproportionation of propylene was demonstrated. The results are shown in the table below, in weight percent.

| Temperature, ° F | 1,034 | 1,088 | 1,117 |
|---|---|---|---|
| Effluent analysis, wt. percent: | | | |
| Ethylene | 0.14 | 0.35 | 0.57 |
| Propylene | ~99.4 | ~98.9 | ~98.4 |
| Butene-1 | 0.26 | 0.31 | 0.34 |
| Cis- and trans-butene-2 | 0.18 | 0.45 | 0.63 |

The data in the table above show that the catalyst system of the present invention is also effective for the disproportionation of propylene into ethylene and of butenes.

In other similar tests, catalysts prepared so as to contain 3.7 weight percent Ru and 6.8 weight percent Ru were also found active for the disproportionation of butene-1 and propylene into disproportionation products.

Reasonable variation and modification are possible within the scope of the claims.

That which is claimed is:

1. A process which comprises contacting at least one olefin reactant having at least 3 carbon atoms per molecule and capable of undergoing the olefin reaction to a significant degree with a catalyst system comprising a silica containing base and ruthenium or a compound of ruthenium and active for converting the olefin reactant according to the olefin reaction, under conditions, including conditions of temperature, pressure and contact time suitable for obtaining a product of the olefin reaction which, as defined herein, can be visualized as comprising the reaction between two first pairs of carbon atoms, the two carbon atoms of each first pair being connected by an olefinic double bond to form two new pairs from the carbon atoms of said first pairs, the two carbon atoms of each of said new pairs being connected by a olefinic double bond, said temperature being in the range of about 750 to about 1200° F.

2. A process according to claim 1 wherein the olefin reactant has up to 10 carbon atoms per molecule.

3. A process according to claim 1 wherein said olefin reactant has up to 6 carbon atoms per molecule.

4. A process according to claim 1 wherein said olefin reactant is an acylic olefin.

5. A process according to claim 1 wherein the catalyst is activated in an oxidizing gas at a temperature in the range of 600 to 1500° F.

6. A process according to claim 1 wherein the olefin reactant is butene and the butene is disproportionated.

7. A process according to claim 1 wherein the olefin reactant is propylene and the propylene is disproportionated.

8. A process according to claim 1 wherein the catalyst system comprises an active catalytic material consisting essentially of silica support material and about 0.1 to about 20 weight percent of ruthenium or a compound of ruthenium calculated as the metal.

9. A process according to claim 8 wherein said active catalytic material is made by impregnating silica with ruthenium oxide or a compound of ruthenium convertible to the oxide by calcination.

10. A process according to claim 1 wherein said silica containing base is predominantly silica.

11. A process according to claim 10 wherein said silica containing base is selected from the group consisting of precipitated silica gel, microspheroidal silica, flame hydrolyzed silica and silica aerogels.

References Cited

UNITED STATES PATENTS

| | | | |
|---|---|---|---|
| 2,666,756 | 1/1954 | Boyd et al. | 252—460 |
| 3,367,988 | 2/1968 | McEuen et al. | 260—683.2 |
| 3,375,293 | 3/1968 | Breckoff et al. | 260—683.2 |
| 2,831,037 | 4/1958 | Schmerling | 260—666 |
| 3,287,427 | 11/1966 | Karol et al. | 260—666 |
| 3,544,649 | 12/1970 | Dixon et al. | 260—683 |

DELBERT E. GANTZ, Primary Examiner

C. E. SPRESSER, JR., Assistant Examiner

U.S. Cl. X.R.

260—666 A, 678 R, 680 R, 683.2